(12) United States Patent
Huang et al.

(10) Patent No.: US 11,604,635 B2
(45) Date of Patent: Mar. 14, 2023

(54) ONLINE PROGRAM UPDATING METHOD

(71) Applicant: DELTA ELECTRONICS, INC., Taoyuan (TW)

(72) Inventors: Hui Huang, Taoyuan (TW); Kai Dong, Taoyuan (TW); Ke Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 84 days.

(21) Appl. No.: 17/111,528

(22) Filed: Dec. 4, 2020

(65) Prior Publication Data

US 2021/0173630 A1 Jun. 10, 2021

(30) Foreign Application Priority Data

Dec. 6, 2019 (CN) .......................... 201911239566.9

(51) Int. Cl.
*G06F 8/65* (2018.01)
*G06F 11/14* (2006.01)

(52) U.S. Cl.
CPC ............ *G06F 8/65* (2013.01); *G06F 11/1469* (2013.01)

(58) Field of Classification Search
USPC ........................................................ 717/170
See application file for complete search history.

(56) References Cited

U.S. PATENT DOCUMENTS

| 11,055,080 B2* | 7/2021 | Kazi | G06F 1/263 |
| 2007/0162708 A1* | 7/2007 | Wang | G06F 3/0607 |
| | | | 711/154 |
| 2016/0098218 A1* | 4/2016 | Kim | G06F 3/0683 |
| | | | 711/162 |
| 2016/0124740 A1* | 5/2016 | Choi | G06F 8/65 |
| | | | 717/168 |
| 2019/0034192 A1* | 1/2019 | Fox | G06F 8/654 |

(Continued)

FOREIGN PATENT DOCUMENTS

| CN | 1047931 A | 12/1990 |
| CN | 100428155 C | 10/2008 |
| CN | 102779079 A | 11/2012 |

(Continued)

OTHER PUBLICATIONS

Steve Taranovich; "Don't 'Brick' My Supply!"; PlanetAnalog.com website [full url in ref.]; 2015 (Year: 2015).*

(Continued)

*Primary Examiner* — Wei Y Zhen
*Assistant Examiner* — Clint Thatcher
(74) *Attorney, Agent, or Firm* — CKC & Partners Co., LLC

(57) ABSTRACT

Embodiments of the present application provide an online program updating method, including: receiving an external command, acquiring an updated program file, and storing the updated program file into the backup area through a program in the application area, where the external command includes the updated program file, and running the updated program file when a program counter jumps to the backup area. This solution, after the program counter jumps to the backup area, runs the updated program file, thereby providing power continuously while updating the online program and improving the reliability of the power supply system.

9 Claims, 3 Drawing Sheets

(56) References Cited

U.S. PATENT DOCUMENTS

2020/0201622 A1\* 6/2020 Tsujimura ............... G06F 21/64

FOREIGN PATENT DOCUMENTS

| CN | 104090796 A | 10/2014 | | |
|---|---|---|---|---|
| CN | 105318502 A | 2/2016 | | |
| WO | WO-2008038063 A1 \* | 4/2008 | ............... | G06F 8/65 |

OTHER PUBLICATIONS

Sam Davis; "Digital Power Supply Controller Enables 'On The Fly' Firmware Upgrades"; ElectronicDesign.com website [full url in ref.]; 2013 (Year: 2013).\*

\* cited by examiner

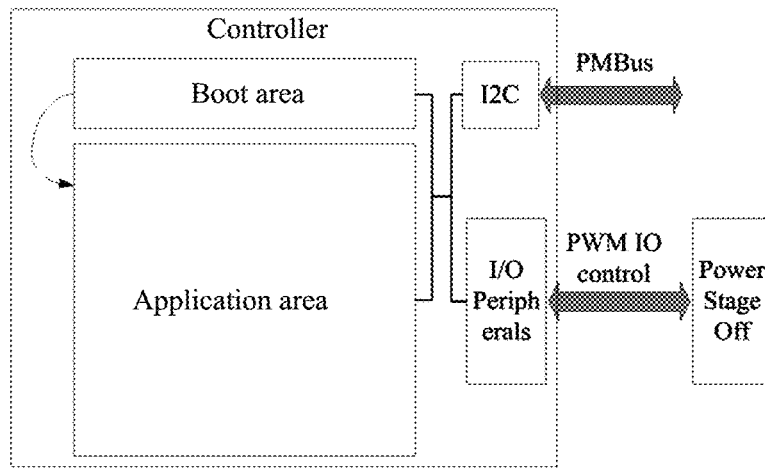
FIG. 1
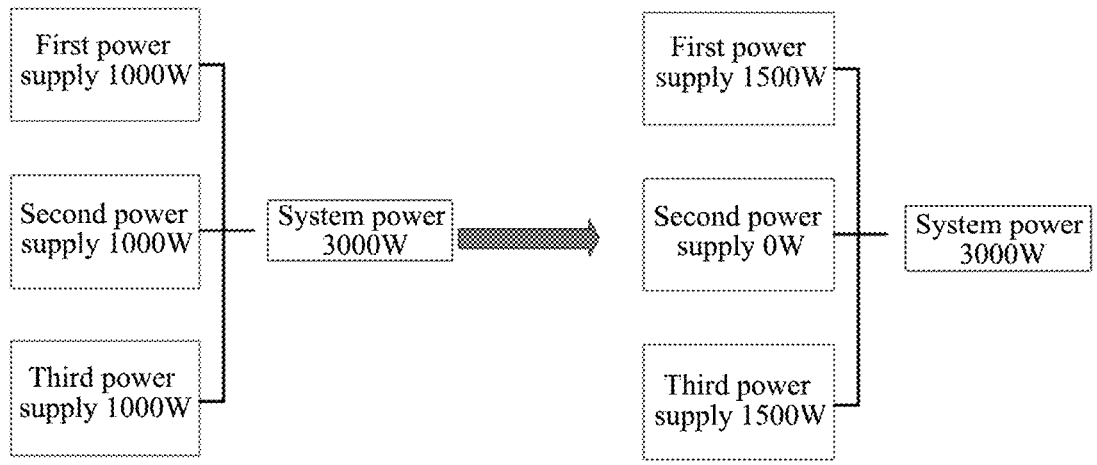
FIG. 2
```
An application area of a controller receives an external
command, and acquire an updated program file, and stores     S101
the updated program file into a backup area through a
program in an application area, where the external
command includes the updated program file
Run the updated program file when a program                  S102
counter jumps to the backup area
```
FIG. 3

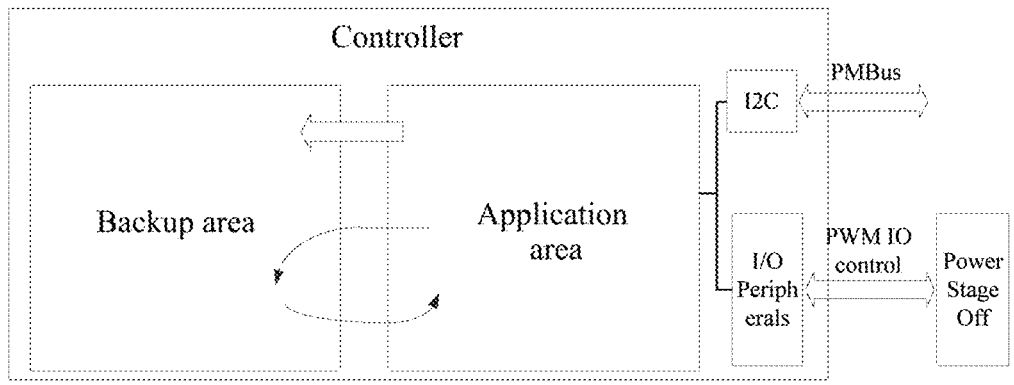

FIG. 4

```
A controller receives an external command, and
acquires an updated program file, and stores the updated
program file into a backup area through a program          S201
in an application area, where the external
command includes the updated program file
```

```
Update, under a preset condition, a program file stored
in the application area to the updated program file stored   S202
in the backup area through jump of a program counter
```

FIG. 5

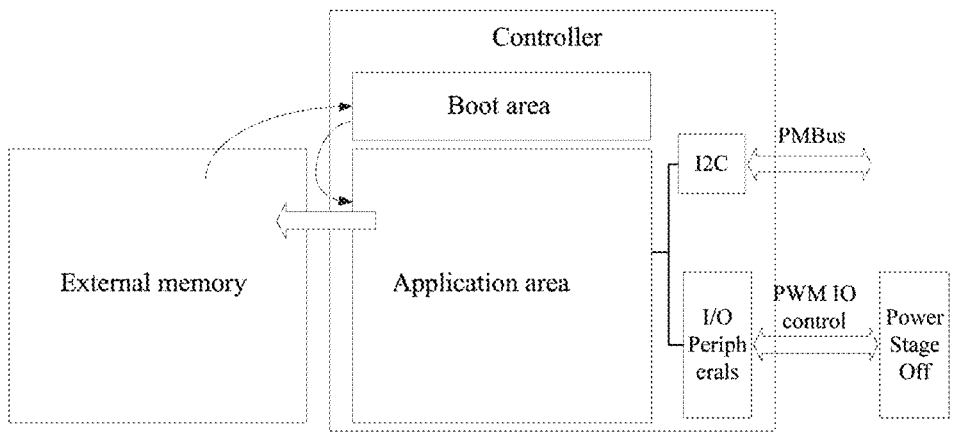

FIG. 6

ONLINE PROGRAM UPDATING METHOD

CROSS-REFERENCE TO RELATED APPLICATION

This application claims priority to Chinese Patent Application No. 201911239566.9, filed on Dec. 6, 2019, which is hereby incorporated by reference in its entirety.

TECHNICAL FIELD

The present application relates to the field of data processing technology, and in particular to an online program updating method.

BACKGROUND

Switching power supplies are widely used in network devices such as servers, network switches, storage devices, and communication base stations. Usually, in order to avoid damaging a circuit in the power supply, shut down the power supply when a controller of the power supply performs online program update. However, according to practical needs, the power supply is required to provide power continuously and reliably, and shutting down the power supply will cause some problems such as communication service interruption and data loss.

Online program update, also referred as Boot loader, is applied to a controller, such as programmable logic devices (PLD), Microcontroller Unit (MCU), digital signal processing (DSP). Using existing communication buses, such as Inter-Integrated Circuit (I2C) bus and Controller Area Network (CAN) bus, to update a program memory area of the controller. Compared with traditional dedicated program programming interfaces, Boot loader does not need to open a chassis or connect with external lead, and program update is more convenient and safe.

The controller is usually divided into a Boot area and an application area, and the controller will run in the Boot area by default after a normal power-on reset. Check a code in the application area by a verification code in the Boot area, if the checking is passed, a program counter will jump to the application area to run. If there is a need to update the application area, the Boot area receives application program data through the existing communication buses, stores it into the application area, and finally enters the application area to run the application data by means of resetting, checking, and jumping. FIG. 1 is a schematic structural diagram of an existing controller according to an embodiment of the present application. As shown in FIG. 1, the controller according to this embodiment can communicate with external devices through an I2C-based power management bus (PMBus), and control a power level circuit of the power supply through a peripheral I/O port.

In practical applications, a power supply, supplying power to network devices such as large servers, network switches, storage devices, and communication base stations, is usually a digital power supply, which is controlled by a power level control loop. The control loop needs very high real-time of data processing. Improper control may cause a driving problem which may damage a power circuit. So the power supply usually needs to be shut down when performing online program update. However, the power supplies are generally required to providing power continuously and reliably all the day, and shutting down the power supplies will cause problems such as communication server interruption and data loss. Therefore, keeping the power supply in an ON state during performing online program update is of great significance to the reliability of the power supply system.

Based on this, the prior art provides a power supply solution, by connecting multiple power supplies in parallel to form a redundant system, thereby jointly providing system power. Redundant system can not only reduce the design difficulty of a single power supply, but also reduce the risk of system losing power caused by power failure, so that when online program update is performed, although the current power supply is shut down, other parallel power supplies can also provide power to the controller of the current power supply. FIG. 2 is a schematic structural diagram of an existing power supply system according to an embodiment of the present application. As shown in FIG. 2, a first power supply, a second power supply, and a third power supply provide power of 1000 W respectively and the system provides power of 3000 W. When the second power supply performs online program update, the power provided by the second power supply is 0W, then in order to keep the system providing power of 3000 W, the first power supply and the third power supply provide power of 1500 W, respectively. In this way, when the current power supply is shut down to perform online program update, other parallel power supplies can also provide power.

However, when the system works under heavy load and the number of parallel power supplies in the system is less, one power supply is shut down to perform online program update, which may cause other power supplies to be shut down in chain due to overcurrent protection, thereby shutting down the power of the entire system.

SUMMARY

The present application provides an online program updating method to implement that a power converter can continuously provide power during an online program update process, to improve the reliability of the power supply system.

In a first aspect, an embodiment of the present application provides an online program updating method, applied to a power converter, where a controller of the power converter includes an application area and a backup area, both the application area and the backup area are capable of running a program file, and the method includes:

receiving an external command, acquiring an updated program file, and storing the updated program file into the backup area through a program in the application area, where the external command includes the updated program file; and running the updated program file when a program counter jumps to the backup area.

In a possible implementation, the program counter jumps to any one of a reset address field, a field after a peripheral reset address, a field after variable initialization, a field after peripheral initialization and a main program field of the program file in the backup area.

In a possible implementation, the method further includes:

running the program file stored in the application area when the program counter jumps to the application area.

In a possible implementation, the application area is a main storage area in the controller, and the backup area is an external memory.

In a possible implementation, the application area and the backup area are a storage area in the controller, the application area and the backup area are divided according to their storage addresses.

In a second aspect, an embodiment of the present application provides an online program updating method, applied to a power converter, where a controller of the power converter includes an application area and a backup area, the application area is capable of running a program file, and the method includes:

receiving an updated program file through the application area and storing the updated program file into the backup area through a program in the application area when receiving an external command, where the external command includes the updated program file; and updating, under a preset condition, the program file stored in the application area to the updated program file stored in the backup area through jump of a program counter.

In a possible implementation, the application area is a main storage area in the controller, and the backup area is an external memory.

In a possible implementation, the preset condition is that partial functions of the power converter are invalid.

In a possible implementation, the controller of the power converter further includes a Boot area.

In a possible implementation, the method further includes:

controlling the program counter to jump to the application area by the Boot area after the program counter jumps to the Boot area, and running the program file stored in the application area under the preset condition.

In a possible implementation, the method further includes:

updating the program file stored in the application area to the updated program file stored in the backup area by the Boot area when the program counter jumps to the Boot area under the preset condition.

In a third aspect, an embodiment of the present application provides an online program updating method, applied to a power converter, where a controller of the power converter includes an application area and a backup area, and the method includes:

receiving an external command by the application area; and sharing the resource of the power converter by the application area and the backup area after a program counter jumps to the backup area.

The online program updating method according to the embodiments of the present application includes: receiving an external command, acquiring an updated program file, and storing the updated program file into the backup area through a program in the application area, where the external command includes the updated program file, and running the updated program file when a program counter jumps to the backup area. This solution, after the program counter jumps to the backup area, runs the updated program file, thereby providing power continuously while updating the online program and improving the reliability of the power supply system.

BRIEF DESCRIPTION OF DRAWINGS

FIG. 1 is a schematic structural diagram of an existing controller according to an embodiment of the present application;

FIG. 2 is a schematic structural diagram of an existing power supply system according to an embodiment of the present application;

FIG. 3 is a flowchart of a first embodiment of an online program updating method according to an embodiment of the present application;

FIG. 4 is a first schematic structural diagram of a controller according to an embodiment of the present application;

FIG. 5 is a flowchart of a second embodiment of an online program updating method according to an embodiment of the present application;

FIG. 6 is a second schematic structural diagram of a controller according to an embodiment of the present application;

DESCRIPTION OF EMBODIMENTS

Figure 7:
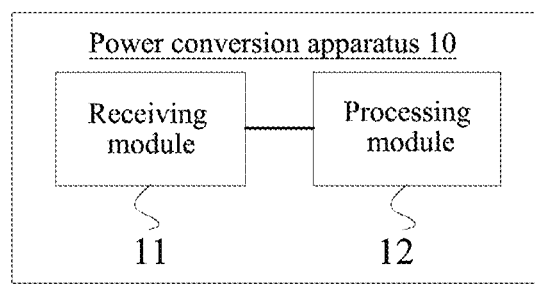
FIG. 7 is a schematic structural diagram of a first embodiment of a power converter according to an embodiment of this application.

In order to make the objects, technical solutions, and advantages of the embodiments of the present application more clear, the technical solutions in the embodiments of the present application will be clearly and completely described in combination with the accompanying drawings in the embodiments of the present application. Obviously, the described embodiments are part of the embodiments of the present application, but not all the embodiments. Based on the embodiments of the present application, all other embodiments obtained by a person of ordinary skill in the art without creative efforts are within the protection scope of the present application.

When the existing power supply system shown in FIG. 2 works under heavy load, and in the case that the number of parallel power supplies is less, one power supply is shut down to perform online program update, which may cause other power supplies to be shut down due to overcurrent protection, thereby shutting down the power of the entire system; and, if program update is interrupted, and a program file of the application area is erased, the controller will be in the Boot area, before program update is performed again, the power supply is in an off state. In addition, since power supplies are updated one by one, the total time for updating all power supplies is long, which requires the power supply system to be capable of updating multiple power supplies simultaneously, however, updating multiple power supplies simultaneously will cause the system power supply to be shut down.

In view of the problems in the prior art, an embodiment of the present application provides an online program updating method, including: receiving an external command, acquiring an updated program file, and storing the updated program file into the backup area through a program in the application area, where the external command includes the updated program file; and running the updated program file when a program counter jumps to the backup area. This solution runs the updated program file when the program counter jumps to the backup area, thereby providing power continuously while updating the online program and improving the reliability of the power supply system.

The technical solution of the present application will be described in detail below through specific embodiments. It should be noted that the following specific embodiments may be combined with each other, and the same or similar concepts or processes may not be repeated in some embodiments. The embodiments of the present application will be described below in combination with the drawings.

FIG. 3 is a flowchart of a first embodiment of an online program updating method according to an embodiment of the present application. The execution body of this embodiment may be a controller of a power converter, and the controller of the power converter includes an application area and a backup area, and both the application area and the backup area can run a program file.

As shown in FIG. 3, the online program updating method according to this embodiment includes the following steps:

S101, the application area of the controller receives an external command, acquire an updated program file, and stores the updated program file into the backup area through a program in the application area, where the external command includes the updated program file.

The power converter may be a power supply applied to a server, a network switch, a communication base station, or the like. The external command is used to instruct to perform online program update for the controller of the power converter, and the external command includes the updated program file.

In order to provide power continuously during online program update, at least the following conditions need to be met: the updated program file is received and stored in a on state, and when the controller runs the program file which is switched from an old program file to a updated program file, the controller cannot be reset or shutdown.

Based on this, the controller in this solution includes the application area and the backup area. The application area is used to store the currently running program file, and the backup area is used to store the updated program file. The application area and the backup area may be divided according to their storage addresses.

In this step, the controller receives the external command, and acquires the updated program file, and stores the updated program file into the backup area through a program in the application.

S102, running the updated program file when the program counter jumps to the backup area.

When the controller receives the external command, it indicates that the controller needs to perform online program update, that is, the controller needs to run the updated program file. When the controller doesn't receive the external command, the application area runs the current program file. After receiving the updated program file through in the application area, the backup area runs the updated program file after the program counter jumps from the application area to the backup area.

In a possible implementation, the program counter jumps to any one of a reset address field, a field after a peripheral reset address, a field after variable initialization, a field after peripheral initialization and a main program field of the program file in the backup area.

In one embodiment, the process of program execution is central processing unit (central processing unit, CPU) resetting, resetting peripheral devices, initializing variables, initializing peripheral devices, and running main program, where the reset address field may be, for example, a CPU reset field; the field after the peripheral reset address may be, for example, a field after CPU reset and before variable initialization.

In this step, according to the actual needs, the program counter jumps to any one of the reset address field, the field after the peripheral reset address, the field after the variable initialization, the field after the peripheral initialization and the main program field of the program file in the backup area, which is not limited in this embodiment. In this way, through the jump of the program counter, seamlessly switching between the old program file and the updated program file is realized.

It should be noted that when the program counter jumps to the field after the peripheral reset address, a peripheral state can maintain a state before the jump; when the program counter jumps to the field after the variable initialization, a variable state can maintain a state before the jump.

In a possible implementation, the method further includes:

running the program file stored in the application area when the program counter jumps to the application area.

In this step, running the program file in the backup area when the main program counter jumps to the backup area, it can also run the program file stored in the application area again after the program counter jumps to the application area. Of course, when jumping to the application area, it can also jump to any one of the reset address field, the field after the peripheral reset address, the field after the variable initialization, the field after the peripheral initialization, and the main program field of the program file in the application area, which is not limited in this embodiment.

In the above process, the jump of the program file is implemented by the program counter, and the entire process is not subject to reset of the controller, and the output of the power converter is normal, thus it is able to provide power continuously.

FIG. 4 is a first schematic structural diagram of a controller according to an embodiment of the present application. As shown in FIG. 4, the controller includes an application area and a backup area. Receiving an external command, and acquiring an updated program file, and storing the updated program file into the backup area through a program in the application area. Jumping back and forth between the program file in the backup area and the program file in the application area can be done through a program counter, so that the controller does not need to be reset, and seamlessly switching of the program files is implemented.

It should be noted that for a digital power supply, a main power control loop is generally implemented through interruption. When a program counter jumps between two program files, in order to ensure a real-time nature of loop operation and output power, the program counter must jump to a first address of a loop control code of the updated program file. If a loop parameter is changed, then a loop variable must be initialized. The controller is not reset in this solution. If the updated program file needs to change a peripheral configuration or a variable data and an address stored in a Random Access Memory (RAM), after the program counter jumps from the application area to the backup area, initialization process should be performed to avoid data loss, misplacement, and failure of peripheral functions.

The online program updating method according to this embodiment includes: receiving an external command, acquiring an updated program file, and storing the updated program file into the backup area through a program in the application area, where the external command includes the updated program file; and running the updated program file when a program counter jumps to the backup area. This solution, running the updated program file when the program counter jumps to the backup area, thereby provides power continuously while updating the online program and improves the reliability of the power supply system.

FIG. 5 is a flowchart of a second embodiment of an online program updating method according to an embodiment of the present application. The execution body of this embodiment may be a power converter, and a controller of the power converter includes an application area and a backup area, and the application area can run a program file.

As shown in FIG. 5, the online program updating method according to this embodiment includes the following steps:

S201, the controller receives an external command, and acquires an updated program file, and stores the updated program file into the backup area through a program in the application area, where the external command includes the updated program file.

In this step, the controller includes the application area and the backup area. The application area is used to store the currently running program file. Receiving the external command, acquiring the updated program file, and storing the updated program file into the backup area through a program in the application area. The backup area does not run the program file, and is only used to store the updated program file.

In a possible implementation, the application area is a main storage area in the controller, and the backup area is an external memory communicated with the application area, which is not limited in this embodiment.

S202, updating, under a preset condition, the program file stored in the application area to the updated program file stored in the backup area through jump of a program counter.

The preset condition may be that partial functions of the power converter are invalid, for example, in the case of shutdown.

In this step, after storing the updated program file into the backup area, the program file in the application area keep running without immediately updating the program file in the application area. Until the preset condition occurs, for example, shutting down the power converter next time or the power converter is shut down in case that shutdown is required for other reasons, the program file stored in the application area can be updated to the updated program file stored in the backup area through the jump of the program counter.

In a possible implementation, the controller of the power converter further includes a Boot area.

In a possible implementation, the method further includes:

controlling the program counter to jump to the application area by the Boot area after the program counter jumps to the Boot area, and running the program file stored in the application area under the preset condition.

The Boot area can be used to check a code in the application area. If the checking is passed, the program counter will jump to the application area to run.

For example, the program file stored in the application area is updated to the updated program file stored in the backup area in the case of shutdown, and then the program file stored in the application area is checked by using the Boot area. If the checking is passed, the Boot area controls the program counter to jump to the application area and runs the program file stored in the application area.

In a possible implementation, step S201 specifically includes:

updating the program file stored in the application area to the updated program file stored in the backup area by the Boot area when the program counter jumps to the Boot area under the preset condition.

Exemplarily, in the case of shutdown, the program counter jumps to the Boot area, and the Boot area reads the updated program file from the backup area, thereby updating the program file stored in the application area to the updated program file stored in the backup area. In this way, after a restart next time, the updated program file in the application area can be run.

FIG. 6 is a second structural diagram of a controller according to an embodiment of the present application. As shown in FIG. 6, the controller includes an application area, a backup area, and a Boot area. The controller receives an external command, and acquires an updated program file, and stores the updated program file into the backup area through a program in the application area. Under a preset condition, the program counter jumps to the Boot area, and the Boot area updates a program file stored in the application area to the updated program file stored in the backup area. In this way, multiple power supplies can be updated simultaneously, and power is not shut down during the entire process, which also solves the problem of longer update time caused by simultaneously updating multiple power supplies in the prior art.

The online program updating method according to this embodiment includes: receiving an external command, acquiring an updated program file and storing stores the updated program file into a backup area through a program in the application area, where the external command includes the updated program file, and updating, under a preset condition, a program file stored in an application area to the updated program file stored in the backup area through jump of a program counter. In this solution, the updated program file is stored in the backup area, and the program file in the application area is updated under the preset condition, which realizes to provide power continuously while performing online program update, and also solves the problem of longer update time caused by simultaneously updating multiple power supplies in the prior art.

An embodiment of the present application also provides an online program updating method, applied to a power converter, where a controller of the power converter includes an application area and a backup area, and the method includes:

receiving an external command by the application area; and sharing the resource of the power converter by the application area and the backup area after a program counter jumps to the backup area.

The external command can be used to instruct to perform online program update for the controller or to instruct to perform program counter jumping.

When the external command is used to instruct to perform online program update for the controller, the external command may include the updated program file, and the application area stores the currently run program file. When the external command is received, the updated program file is run when the program counter jumps to the backup area, thereby realizing online program update without shutting down the power and improving the reliability of the power supply system. The specific implementation process can refer to the embodiments of FIG. 1 and FIG. 5.

When an external command is used to instruct to perform program counter jumping, both the application area and the backup area can store the currently running program file. When the external command is received, the program file in the backup area is run when the program counter jumps to the backup area.

The following is an apparatus embodiment of the present application, which can be used to execute the method embodiments of the present application. The details are already introduced in the method embodiments of the present application, which will not be repeated here.

FIG. 7 is a schematic structural diagram of a first embodiment of a power converter according to an embodiment of the present application. The power converter 10 includes:

a receiving module 11, configured to receive an external command, and acquire an updated program file, and stores the updated program file into a backup area through a program in an application area, where the external command includes the updated program file; and a processing module 12, configured to control a program counter jumping to the backup area to run the updated program file.

In a possible implementation, the program counter jumps to any one of a reset address field, a field after a peripheral reset address, a field after variable initialization, a field after peripheral initialization and a main program field of the program file in the backup area.

In a possible implementation, the controller is provided in the processing module 12, and/or in the receiving module 11.

In a possible implementation, the processing module is further configured to:

control the program counter jumping to the application area to run a program file stored in the application area.

The apparatus according to the embodiment of the present application may be used to execute the method in the embodiment of FIG. 3, and its implementation principle and technical effect are similar, which will not be repeated here.

Figure 8:
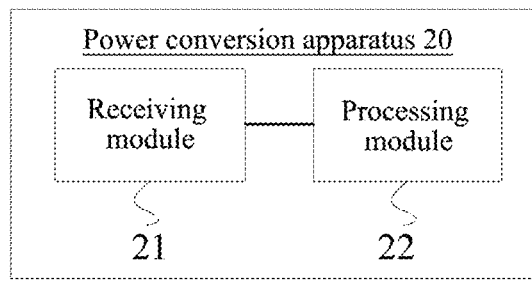
FIG. 8 is a schematic structural diagram of a second embodiment of a power converter according to an embodiment of the present application.

FIG. 8 is a schematic structural diagram of a second embodiment of a power converter according to an embodiment of the present application. The power converter 20 includes:

a receiving module 21, configured to receive an external command, and acquire an updated program file, and stores the updated program file into a backup area through a program in an application area, where the external command includes the updated program file; and a processing module 22, configured to update, under a preset condition, a program file stored in the application area to the updated program file stored in the backup area through jump of a program counter.

In a possible implementation, the application area is provided in a main storage area of the controller, and the backup area is provided in an external memory which can be read or written by the application program of the controller.

In a possible implementation, the controller is provided in the processing module 22, and/or in the receiving module 21.

In a possible implementation, the preset condition is that partial functions of the power converter are invalid.

In a possible implementation, the controller of the power converter further includes a Boot area.

In a possible implementation, the processing module is further configured to:

jump, under the preset condition, to the Boot area through the program counter, where the Boot area controls the program counter to jump to the application area to run the program file stored in the application area.

In a possible implementation, the processing module is further configured to:

jump, under the preset condition, to the Boot area through the program counter, where the Boot area updates the program file stored in the application area to the updated program file stored in the backup area.

The apparatus according to the embodiment of the present application may be used to execute the method in the embodiment of FIG. 5, and its implementation principle and technical effect are similar, which will not be repeated here.

An embodiment also provides a power converter, including:

a processing module, configured to receive an external command, and share the resource of the power converter through a program in the application area and the backup area after a program counter jumps to the backup area, such as a receiving module and a processing module.

An embodiment of the present application further provides a storage medium storing commands therein. The executions, applied to a computer, cause the computer to execute the above method embodiments.

It can be understood that, in the embodiments of the present application, the order of sequence numbers of the above various processes does not mean the sequence of execution order, and the execution order of various processes should be determined by its function and internal logic, and should not constitute any limitation on implementation processes of the present application.

Finally, it should be noted that the above embodiments are merely intended for describing, rather than limiting, the technical solutions of the present application; although the present application has been described in detail with reference to the foregoing various embodiments, those skilled in the art will understand that they may still make modifications to the technical solutions described in the foregoing various embodiments, or make equivalent substitutions to some or all of the technical features therein; and these modifications or substitutions do not make the essence of the corresponding technical solutions deviate from the scope of the technical solutions in the various embodiments of the present application.

What is claimed is:

1. An online program updating method, applied to a power converter, wherein a controller of the power converter comprises an application area and a backup area, both the application area and the backup area are capable of running a program file, and the method comprises:

receiving an external command, acquiring an updated program file, and storing the updated program file into the backup area through a program in the application area, wherein the external command comprises the updated program file; and running the updated program file when a program counter jumps to the backup area; wherein the program counter jumps to any one of a reset address field, a field after a peripheral reset address, a field after variable initialization and a field after peripheral initialization of the program file in the backup area.

2. The method according to claim 1, wherein the method further comprises:

running the program file stored in the application area when the program counter jumps to the application area.

3. The method according to claim 1, wherein the application area is a main storage area in the controller, and the backup area is an external memory.

4. The method according to claim 1, wherein the application area and the backup area are a storage area in the controller, the application area and the backup area are divided according to their storage addresses.

5. An online program updating method, applied to a power converter, wherein a controller of the power converter comprises an application area and a backup area, the application area is capable of running a program file, and the method comprises:

receiving an updated program file and storing the updated program file into the backup area through a program in the application area when receiving an external command, wherein the external command comprises the updated program file; and updating, under a preset condition, the program file stored in the application area to the updated program file stored in the backup area through a jump of a program counter; wherein the controller of the power converter further comprises a Boot area, and updating, under the preset condition, the program file stored in the application area to the updated program file stored in the backup area through the jump of a program counter comprises:

updating the program file stored in the application area to the updated program file stored in the backup area by the Boot area when the program counter jumps to the Boot area under the preset condition.

6. The method according to claim 5, wherein the application area is a main storage area in the controller, and the backup area is an external memory.

7. The method according to claim 5, wherein the preset condition is that partial functions of the power converter are invalid.

8. The method according to claim 5, further comprising:

controlling the program counter to jump to the application area by the Boot area after the program counter jumps to the Boot area, and running the program file stored in the application area under the preset condition.

9. An online program updating method, applied to a power converter, wherein a controller of the power converter comprises an application area and a backup area, and the method comprises:

receiving an external command by the application area; and sharing the resource of the power converter by the application area and the backup area after a program counter jumps to the backup area; wherein the program counter jumps to any one of a reset address field, a field after a peripheral reset address, a field after variable initialization and a field after peripheral initialization of a program file in the backup area.

\* \* \* \* \*